(12) United States Patent
Wright

(10) Patent No.: US 11,486,818 B2
(45) Date of Patent: Nov. 1, 2022

(54) METHODS AND SYSTEMS FOR COHERENT MULTIDIMENSIONAL SPECTROSCOPY

(71) Applicant: Wisconsin Alumni Research Foundation, Madison, WI (US)

(72) Inventor: John Curtis Wright, Oregon, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 17/329,454

(22) Filed: May 25, 2021

(65) Prior Publication Data

US 2021/0372918 A1 Dec. 2, 2021

Related U.S. Application Data

(60) Provisional application No. 63/029,812, filed on May 26, 2020.

(51) Int. Cl.
*G01N 21/31* (2006.01)

(52) U.S. Cl.
CPC .................. *G01N 21/31* (2013.01)

(58) Field of Classification Search
CPC ............ G01N 21/31; G01N 2021/653; G01N 21/35; G01N 2201/06113;
(Continued)

(56) References Cited

U.S. PATENT DOCUMENTS

| 7,092,086 B2 | 8/2006 | Knebel |
| 9,267,893 B2 | 2/2016 | Wright et al. |

(Continued)

FOREIGN PATENT DOCUMENTS

| EP | 2830169 A2 * | 1/2015 | .......... G02F 1/3534 |
| WO | WO 91/07651 | 5/1991 | |

OTHER PUBLICATIONS

7. Pakoulev, A. V. et al. "Mixed frequency-/time-domain coherent multidimensional spectroscopy: research tool or potential analytical method?"Acc Chem Res. Sep. 15, 2009;42(9):1310-21. doi: 10.1021/ar900032g. PMID: 19445479 (Year: 2009).*

(Continued)

*Primary Examiner* — Tarifur R Chowdhury
*Assistant Examiner* — Roberto Fabian, Jr.
(74) *Attorney, Agent, or Firm* — Bell & Manning, LLC

(57) ABSTRACT

A method for coherent multidimensional spectroscopy may comprise illuminating a location in a sample with a set of m coherent light pulses, each coherent light pulse having an initial frequency $\omega_m$ and an initial wave vector $\vec{k}_m$, wherein $m \geq 2$, to generate a coherent output signal having an initial frequency $\omega_{output} = \Sigma \pm \omega_m$ and an initial wavevector wave vector $\vec{k}_{output} = \Sigma \pm \vec{k}_m$; scanning a first coherent light pulse of the set of m coherent light pulses across a set of i frequency values, wherein $i \geq 2$, the set of i frequency values including the first coherent light pulse having initial frequency $\omega_1$; scanning, simultaneously, a second coherent light pulse of the set of m coherent light pulses across a set of i correlated frequency values, the set of i correlated frequency values including the second coherent light pulse having initial frequency $\omega_2$, wherein each correlated frequency value is associated with a corresponding frequency value of the set of i frequency values as a correlated frequency grouping; and detecting the coherent output signal. Each correlated frequency value is selected so that the coherent output signal generated at each correlated frequency grouping equals the initial frequency $\omega_{output}$ and the coherent output signal generated at each correlated frequency grouping equals the initial wavevector $\vec{k}_{output}$.

18 Claims, 12 Drawing Sheets

(58) Field of Classification Search
CPC ............ G01N 2201/0697; G01N 21/65; G01J 3/4338; G01J 3/44; G01J 3/02
See application file for complete search history.

(56) References Cited

U.S. PATENT DOCUMENTS

| | | | |
|---|---|---|---|
| 10,823,664 | B2 | 11/2020 | Morrow et al. |
| 2006/0063188 | A1* | 3/2006 | Zanni ............... G01N 33/54373 435/6.1 |
| 2008/0012850 | A1 | 1/2008 | Keating, III |
| 2015/0092190 | A1* | 4/2015 | Wright ................... G01N 21/65 356/301 |

OTHER PUBLICATIONS

Boyle et al., Fully Coherent Triple Sum Frequency Spectroscopy of a Benzene Fermi Resonance, The Journal of Physical Chemistry A, vol. 117, Jun. 17, 2013, pp. 5578-5588.

Cheng et al., Coherent Anti-Stokes Raman Scattering Microscopy: Instrumentation, Theory, and Applications, J. Phys. Chem. B, vol. 108, Dec. 25, 2003, pp. 827-840.

Denk et al., Two-Photon Laser Scanning Fluorescence Microscopy, Science, vol. 248, Apr. 6, 1990, pp. 73-76.

Potma et al., Heterodyne coherent anti-Stokes Raman scattering (CARS) imaging, Optics Letters, vol. 31, No. 2, Jan. 15, 2006, pp. 241-243.

Boyle et al., Fully Coherent Hybrid Raman-IR Multidimensional Spectroscopies, Poster, Society for Applied Spectroscopy, SciX, Milwaukee, WI, Sep. 29, 2013.

Morrow et al., Multi-photon pump, multi-photon spectroscopies and their application to $MX_2$ nanostructures, Poster, presented at the 9th International Conference on Coherent Multidimensional Spectroscopy, Korea University, Seoul, South Korea, Jun. 27, 2018.

M. Cho, Theoretical description of two-dimensional vibrational spectroscopy by infrared-infrared-visible sum frequency generation, Physical Review A, vol. 61, Jan. 2000, pp. 023406-1-023406-12.

M. Cho, Triply resonant infrared-infrared-visible sum frequency generation: Three-dimensional vibronic spectroscopy for the investigation of vibrational and vibronic couplings, Journal of Chemical Physics, vol. 112, No. 20, May 22, 2000, pp. 9002-9014.

M. Cho, Two-dimensional vibrational spectroscopy. VII. Investigation of the vibronic and vibrational couplings by using novel triply resonant two-dimensional vibrational spectroscopies, Journal of Chemical Physics, vol. 113, No. 18, Nov. 8, 2000, pp. 7746-7755.

Bonn et al., Novel Surface Vibrational Spectroscopy: Infrared-Infrared-Visible Sum-Frequency Generation, Physical Review Letters, vol. 86, No. 8, Feb. 19, 2001, pp. 1566-1569.

M. Cho, Lateral interactions between adsorbed molecules: Investigations of CO on Ru(001) using nonlinear surface vibrational spectroscopies, Physical Review B, vol. 65, May 23, 2002, pp. 205423-1-205423-10.

Hess et al., Doubly vibrationally resonant spectroscopy of CO on Ru(001), Surface Science, vol. 502-503, 2002, pp. 123-128.

Morrow et al., Triple sum frequency pump-probe spectroscopy of transition metal dichalcogenides, Physical Review B 100, Dec. 4, 2019, pp. 235303-1 to 235303-16.

* cited by examiner

Quantum Pathways I-V $$\vec{k}_1 = \frac{n_1\omega_1}{c} \quad \vec{k}_3 = \frac{n_3\omega_3}{c}$$

$$\vec{k}_2 = \frac{n_2\omega_2}{c} \quad \vec{k}_4 = \frac{n_4\omega_4}{c}$$

Sellmeier Equation $\quad n(\lambda) = \sqrt{A + \frac{B\lambda^2}{\lambda^2 - C} + \frac{D\lambda^2}{\lambda^2 - E}} \quad \vec{k}_4 = \frac{n_4\omega_4}{c} \quad \Delta\vec{k} = \vec{k}_4 - \vec{k}_{polarization}$ $$\vec{k}_{polarization} = \vec{k}_1 - \vec{k}_2 + \vec{k}_3$$

FIG. 3

METHODS AND SYSTEMS FOR COHERENT MULTIDIMENSIONAL SPECTROSCOPY

CROSS REFERENCE TO RELATED APPLICATIONS

The present application claims priority to U.S. provisional patent application No. 63/029,812 that was filed May 26, 2020, the entire contents of which are incorporated herein by reference.

REFERENCE TO GOVERNMENT RIGHTS

This invention was made with government support under 1709060 awarded by the National Science Foundation. The government has certain rights in the invention.

BACKGROUND

The basis of all spectroscopy is the creation of a coherence of quantum states by an electromagnetic field. Light entangles molecular states to form a coherence, i.e., a superposition where the entity is in multiple states simultaneously. If more than two states are entangled, it is a multiple quantum coherence (MQC). The spatial (wave vector $\vec{k}$) and temporal (angular frequency $\omega$) parts of the resulting MQC wavefunction is a linear combination of quantum states, each with amplitude, $$c_n: \Psi(x, t) = \sum_n c_n(t)\psi_n(x)e^{i(\vec{k}_n \cdot \vec{z} - \omega_n t)},$$

wherein n equals the coupled quantum states. This MQC wavefunction is known as a Schrödinger cat state.

Coherent Multidimensional Spectroscopy (CMDS) is a type of spectroscopy based upon forming Schrödinger cat states by exciting multiple vibrational and electronic states in a target entity on time scales (e.g., picoseconds, femtoseconds) that are short or comparable to the timescale over which the MQCs decay. This is accomplished by temporally and spatially overlapping ultrafast coherent excitation beams in a sample containing the target entity. The Schrödinger cat states create directional emission whose intensity depends upon the enhancements that occur when the frequencies of the coherent excitation beams are resonant with specific quantum state transitions in the target entity.

SUMMARY

Provided are methods and systems for coherent multidimensional spectroscopy.

A method for coherent multidimensional spectroscopy may comprise illuminating a location in a sample with a set of m coherent light pulses, each coherent light pulse having an initial frequency $\omega_m$ and an initial wave vector $\vec{k}_m$, wherein m≥2, to generate a coherent output signal having an initial frequency $\omega_{output} \Sigma \pm \omega_m$ and an initial wavevector wave vector $\vec{k}_{output} = \Sigma \pm \vec{k}_m$; scanning a first coherent light pulse of the set of m coherent light pulses across a set of i frequency values, wherein i≥2, the set of i frequency values including the first coherent light pulse having initial frequency $\omega_1$; scanning, simultaneously, a second coherent light pulse of the set of m coherent light pulses across a set of i correlated frequency values, the set of i correlated frequency values including the second coherent light pulse having initial frequency $\omega_2$, wherein each correlated frequency value is associated with a corresponding frequency value of the set of i frequency values as a correlated frequency grouping; and detecting the coherent output signal. Each correlated frequency value is selected so that the coherent output signal generated at each correlated frequency grouping equals the initial frequency $\omega_{output}$ and the coherent output signal generated at each correlated frequency grouping equals the initial wavevector $\vec{k}_{output}$.

Systems for coherent multidimensional spectroscopy are also provided, as well as controllers and non-transitory computer-readable media for such systems.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 3 further illustrates the problem of phase matching in CMDS, using any of the quantum pathways I-V of FIG. 1 as an example.

DETAILED DESCRIPTION

Provided are methods and systems for coherent multidimensional spectroscopy (CMDS). As noted above, CMDS involves creating Schrödinger cat states in a target entity by illuminating the target entity with coherent light pulses. Existing CMDS methods are generally time domain methods based on measuring the phase modulations of the coherences in the Schrödinger cat states as time delays between the coherent light pulses are scanned. This greatly limits the spectral width of such methods, as determined by the time-bandwidth product. By contrast, the present methods involve scanning the frequency of at least one of the coherent light pulses. In the present methods, the problem of phase matching is solved by making simultaneous and correlated frequency changes in another of the coherent light pulses. As a result, the full power of CMDS is realized. The improved CMDS methods may then be leveraged to resolve spectral congestion inherent in complex materials while measuring their optical properties over much greater spectral widths.

The present methods comprise illuminating a location in a sample with a set of m coherent light pulses, each coherent light pulse having a frequency $\omega_m$ and a wave vector $\vec{k}_m$, wherein m≥2. The multiple coherent light pulses interact with a target entity in the sample to generate a nonlinear output polarization, which acts as the source of radiation for a coherent output signal comprising a frequency $\omega_{output}=\Sigma\pm\omega_m$ and a wave vector $\vec{k}_{output}=\Sigma\pm\vec{k}_m$. Specific quantum pathways excited in the target entity are defined by specific combinations of $\omega_m$ and $\vec{k}_m$. Thus, different coherent output signals exist, each characterized by different frequencies and wave vectors and associated with different quantum pathways. A particular quantum pathway is monitored by detecting the coherent output signal in the corresponding phase matched direction given by $\vec{k}_{output}$ for that particular quantum pathway.

Figure 1:
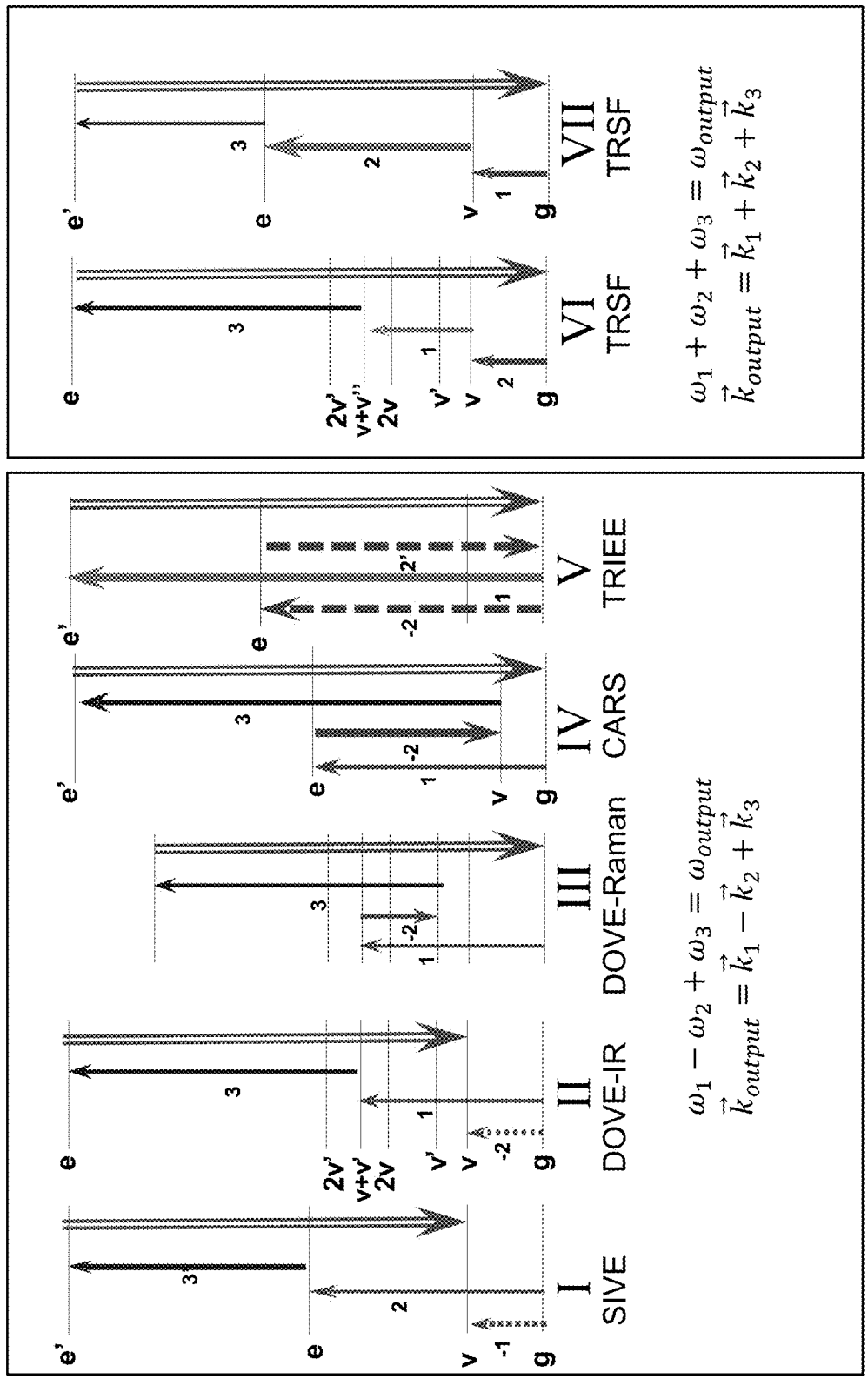
FIG. 1 shows illustrative coherent multidimensional spectroscopy (CMDS) excitation schemes for probing quantum pathways I-VII.

FIG. 1 shows illustrative quantum pathways associated with different illustrative CMDS excitation schemes when using three coherent light pulses, i.e., m=3. The numeric labels 1, 2, 3 for the arrows correspond to individual coherent light pulses of the three coherent light pulses. The time ordering of the coherent light pulses proceeds from left to right. The illustrative quantum pathways include: singly vibrationally enhanced (SIVE); doubly vibrationally enhanced-infrared (DOVE-IR); doubly vibrationally enhanced-Raman (DOVE-Raman); coherent anti-Stokes Raman spectroscopy (CARS); triply electronically enhanced (TRIEE); and triply resonant sum frequency (TRSF). The VI TRSF and VII TRSF pathways are similar, but VII TRSF substitutes a second electronic transition for the combination band transition. FIG. 1 also shows that the quantum pathways I-V are each characterized by a coherent output signal comprising a frequency $\omega_{output}=\omega_1-\omega_2+\omega_3$ and a wave vector $\vec{k}_{output}=\vec{k}_1-\vec{k}_2+\vec{k}_3$. The quantum pathways VI and VII are each characterized by a coherent output signal comprising a frequency $\omega_{output}=\omega_1+\omega_2+\omega_3$ and a wave vector $\vec{k}_{output}=\vec{k}_1+\vec{k}_2+\vec{k}_3$.

Throughout the present disclosure, the subscripts m on $\omega_m$, e.g., 1, 2, and 3 on $\omega_1$, $\omega_2$, and $\omega_3$, are meant only to distinguish individual, independent coherent light pulses from one another. They are not meant to refer to any particular frequency or any particular time ordering.

Figure 2:
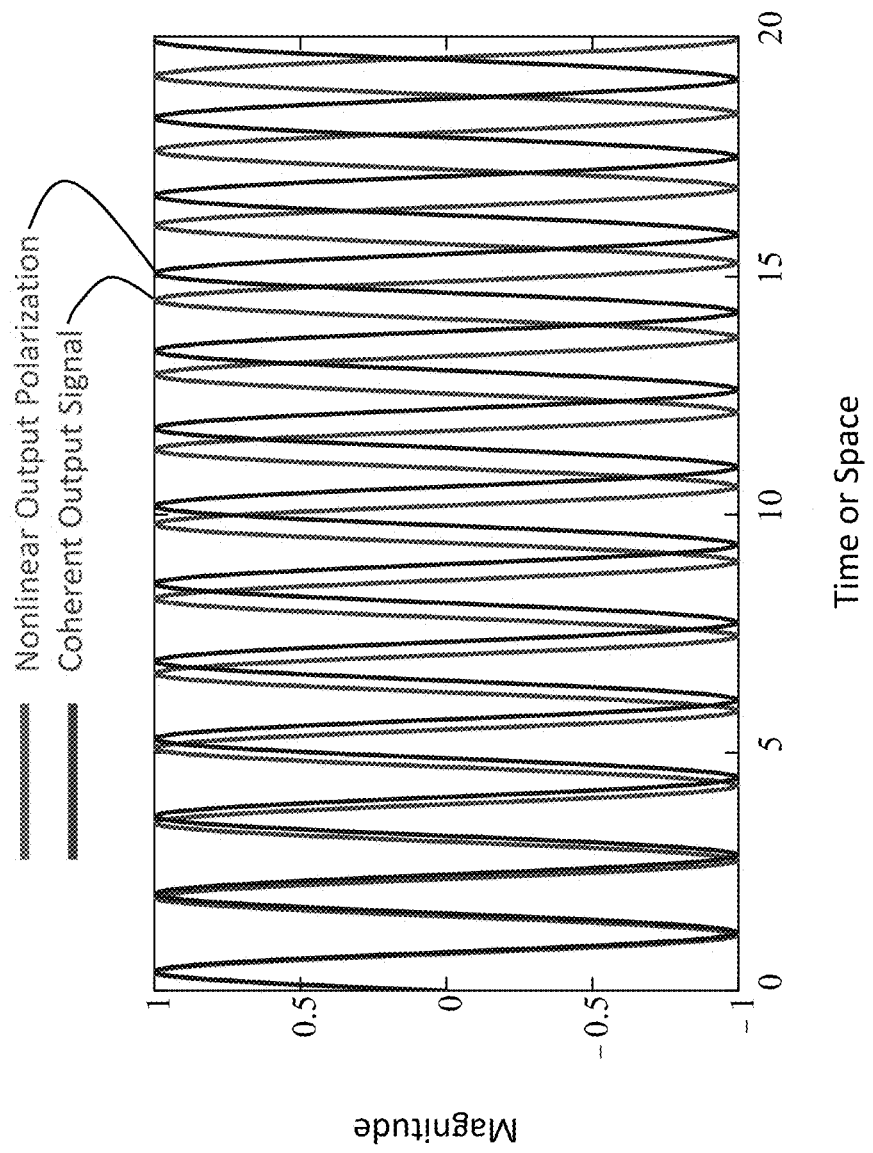
FIG. 2 is a plot of the magnitude of a nonlinear output polarization induced by multiple coherent light pulses and the magnitude of a coherent output signal generated by that nonlinear output polarization, as a function of time/space. This plot illustrates the problem of phase matching in CMDS.

FIG. 2 illustrates the problem of phase matching in detecting a coherent output signal created by the nonlinear output polarization induced by the coherent light pulses. FIG. 2 plots the magnitudes of the nonlinear output polarization induced by the coherent light pulses and the electromagnetic field generated by that nonlinear output polarization, i.e., the coherent output signal. The coherent output signal has a different frequency (higher) and thus, a different index of refraction (higher), as compared to the nonlinear output polarization that created it. Thus, eventually, the two get out of phase with each other and destructively interfere. In order to be able to detect the coherent output signal, the phase of the oscillating nonlinear output polarization and the resulting coherent output signal must be matched.

Using any of quantum pathways I-V of FIG. 1 as an illustrative example, FIG. 3 further illustrates the problem of phase matching. In this case, the beam geometry is such that the three coherent light pulses (1, 2, and 3) are collinear, along with the coherent output signal (labeled 4). (Throughout the present disclosure, the phrase "beam geometry" refers to the orientation of each coherent light pulse's propagation axis relative to some reference, e.g., relative to the propagation axis of another coherent light pulse in the set of m coherent light pulses or relative to normal to a plane defined by the sample.) The wave vectors $\vec{k}$ for the three coherent light pulses and the coherent output signal are each given by the equations shown, wherein c is the speed of light, $\omega_m$ is frequency, and $n_m$ is the wavelength-dependent index of refraction, given by the Sellmeier equation. The constants A, B, C, D, and E in the Sellmeier equation are determined by the composition of the sample. As described above with respect to FIG. 2, because the coherent output signal has a higher frequency and a higher index of refraction, the wave vector $\vec{k}_4$ is longer than the wave vector $\vec{k}_{polarization}$ of the nonlinear output polarization that created it. Phase matching involves ensuring that $\Delta\vec{k}=\vec{k}_4-\vec{k}_{polarization}=0$, i.e., that $\vec{k}_4=\vec{k}_{polarization}=\vec{k}_1-\vec{k}_2+\vec{k}_3$.

Figure 4:
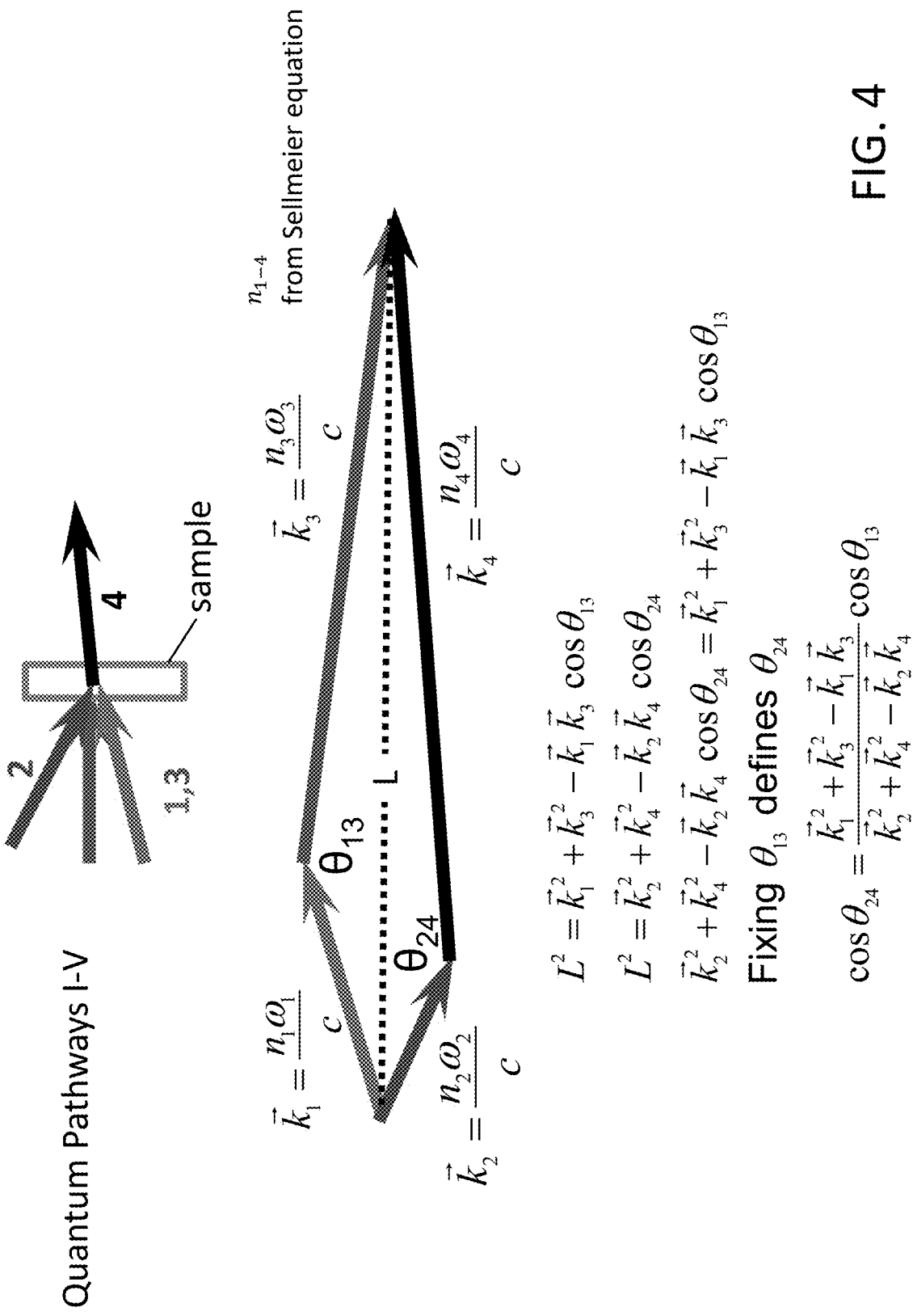
FIG. 4 illustrates how to achieve a phase matched beam geometry for three coherent light pulses when none are collinear.
Figure 5:
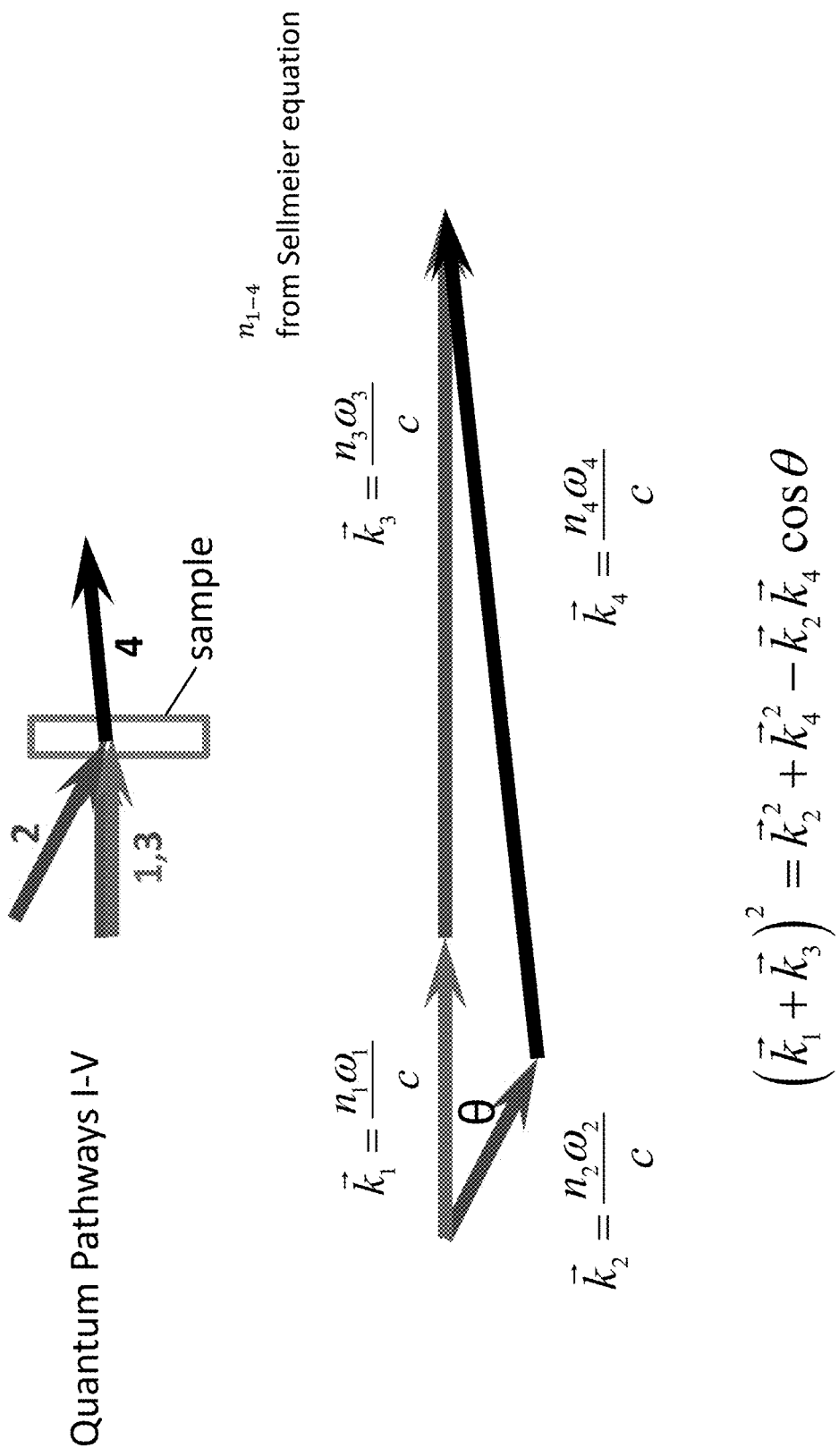
FIG. 5 illustrates how to achieve a phase matched beam geometry for three coherent light pulses when two are collinear.

FIGS. 4 and 5 illustrate how to ensure such phase matching by selecting an appropriate beam geometry, i.e., by adjusting the angles between the propagating coherent light pulses. FIG. 4 illustrates the general case in which the beam geometry is such that each of the three coherent light pulses has a different propagation axis and propagates toward the sample with a different angle. Phase matching is achieved by finding the angles that ensure that $\vec{k}_{4(output)}=\vec{k}_1-\vec{k}_2+\vec{k}_3$. In this case, by selecting an angle for one pair of the coherent light pulses, e.g., $\theta_{13}$, and using the remaining trigonometric equations, the angle $\theta_{24}$ between the remaining coherent light pulse and the coherent output signal may be determined. The coherent output signal for any of the quantum pathways I-V of FIG. 1 may be monitored by propagating the three coherent light pulses at the given angles and placing a detector coincident with $\vec{k}_{4(output)}$. FIG. 5 illustrates the case in which two of the three coherent light pulses are collinear and propagate toward the sample with the same angle. Again, the coherent output signal for any of the quantum pathways I-V of FIG. 1 may be monitored by propagating the three coherent light pulses at the given angles and placing a detector coincident with $\vec{k}_{4(output)}$.

As noted above, the present method comprises illuminating the location in the sample with the set of m coherent light pulses. In this step, the frequency $\omega_m$ and wave vector $\vec{k}_m$ of each coherent light pulse may each be at initial values. The beam geometry used is one selected to optimize phase matching for a desired CDMS excitation scheme so as to generate a detectable coherent output signal having an initial frequency $\omega_{output}=\Sigma\pm\omega_m$ and an initial wave vector $\vec{k}_{output}=\Sigma\pm\vec{k}_m$. Next, the method comprises scanning a first of the coherent light pulse of the set of m coherent light pulses across a set of i frequency values, wherein i≥2. The set of i frequency values may include the first coherent light pulse having its initial frequency value, e.g., $\omega_1$. As such, the first data point of the "scan" may actually be achieved by the illumination step described above. The initial frequency value, the value of i (i.e., number of frequency values) as well as the frequency step size between each frequency value are not particularly limited. Rather, these values depend upon the desired CDMS excitation scheme and target entity. However, regarding the initial frequency value, frequencies in the infrared region (e.g., from 3 to 20 μm), those in the near-infrared region (e.g., from 0.8 to 3 μm), those in the visible region (e.g., from 0.4 to 0.8 μm), and those in the ultra-violet region (e.g., from 200 to 400 nm) of the electromagnetic spectrum may be used. Similarly, the value of m is not particularly limited. However, in embodiments, m=2, 3, or 4.

At least one innovation underlying the present methods is that at the same time as the first coherent light pulse is scanned, a second coherent light pulse of the set of m coherent light pulses is also scanned (i.e., simultaneously) across a set of i correlated frequency values. This set of i correlated frequency values may include the second coherent light pulse having its initial frequency value, e.g., $\omega_2$. Each correlated frequency value in the set of i correlated frequency values is associated with a corresponding frequency value in the set of i frequency values. The correlated frequency value and its corresponding frequency value are members of a correlated frequency grouping. In the case of the first and second coherent light pulses being scanned simultaneously, the "grouping" is a "pair."

By way of illustration, the set of i frequency values for the first coherent light pulse may include four (i.e., i=4) frequency values $\omega_{1_1}$, $\omega_{1_2}$, $\omega_{1_3}$ and $\omega_{1_4}$. Each correlated frequency value in the set of i=4 correlated frequency values is then given by $\omega_{2_1}$, $\omega_{2_2}$, $\omega_{2_3}$ and $\omega_{2_4}$. The corresponding values are members of correlated frequency pairs, i.e., $(\omega_{1_1}, \omega_{2_1})$, $(\omega_{1_2}, \omega_{2_2})$, $(\omega_{1_3}, \omega_{2_3})$, and $(\omega_{1_4}, \omega_{2_4})$ are each correlated frequency pairs.

Another innovation underlying the present methods is that each correlated frequency value (i.e., $\omega_{2_1}, \omega_{2_2}, \ldots, \omega_{2_j}$) is selected so that the coherent output signal generated at each correlated frequency grouping equals the initial frequency $\omega_{output}$ and the coherent output signal generated at each correlated frequency grouping equals the initial wave vector $\vec{k}_{output}$. That is, the simultaneous scanning is carried out so that the phase matching condition is maintained during the scanning. Moreover, rather than maintaining the phase matching condition by changing the beam geometry as the first coherent light pulse is scanned (i.e., at each and every frequency value in the set of i frequency values), correlated frequency changes are made in the second coherent light pulse. This means that the simultaneous scanning may be carried out using a single, fixed beam geometry, i.e., without changing the beam geometry during the simultaneous scanning. (This does not preclude the present methods comprising other steps which may be carried out using different beam geometries.) As further described below, a system may be used for carrying out the present methods which comprises a controller configured to calculate the required correlated frequency changes/values based upon user input and subsequently output the correlated frequency changes/values to other components of the system in order to perform the scanning described above.

It is noted that the frequency change (the change that is made in the first coherent light pulse) and the correlated frequency change (the change that is made in the second coherent light pulse to achieve optimum phase matching) are generally not the same. That is, the magnitude of the changes, the direction of the changes (i.e., whether an increase or decrease), or both, are generally different.

Finally, the present methods further comprise detecting the coherent output signal while the first and second coherent light pulses are simultaneously scanned. The phrase "detecting" may encompass both detecting an intensity of the coherent output signal as well as its frequency. It is noted that the coherent output signal has two contributions, the driven signal obtained when the light sources for the coherent light pulses in the set of m coherent light pulses are on (i.e., during illumination) and the free induction decay signal when the light sources are off. These contributions may have different frequencies unless the coherent light pulses are at frequencies resonant with specific quantum transitions within the target entity. In addition, detecting the coherent output signal may involve detecting over a range of frequencies, e.g., by employing a scannable monochromator.

The embodiment of the present methods described above refers to simultaneous scanning of two coherent light pulses of the set of m coherent light pulses. However, it is noted that more than two coherent light pulses may be scanned simultaneously in the present methods, including all of the coherent light pulses. Thus, a "correlated frequency grouping" may include more than two members. In such embodiments, however, the correlated frequency values in the correlated frequency groupings are selected to maintain optimum phase matching as described above. In embodiments, the coherent light pulses which are scanned simultaneously are those which are collinear. In embodiments, all the coherent light pulses are collinear and all may be scanned simultaneously.

Figure 6:
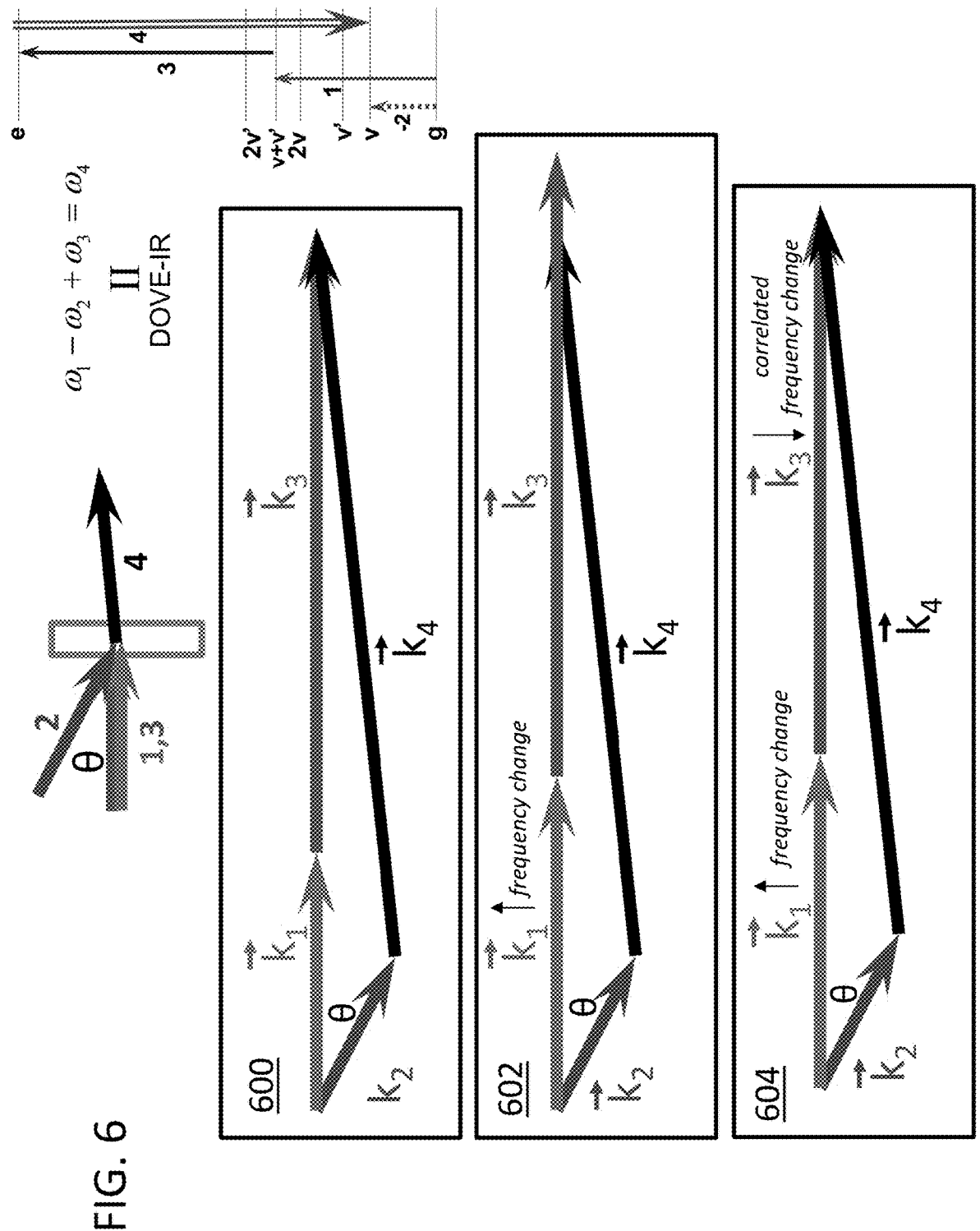
FIG. 6 illustrates the present methods according to an illustrative embodiment.

FIG. 6 illustrates an embodiment of the present methods involving three coherent light pulses (m=3) and the DOVE-IR quantum pathway of FIG. 1. The beam geometry of FIG. 5 is used. Specifically, as shown in panel 600, the first and third coherent light pulses are collinear and the angle θ is selected to achieve phase matching for initial frequencies $\omega_1$, $\omega_2$, $\omega_3$, initial wave vectors $\vec{k}_1$, $\vec{k}_2$, $\vec{k}_3$, and the DOVE-IR quantum pathway $\vec{k}_{4(output)} = \vec{k}_1 - \vec{k}_2 + \vec{k}_3$. Next, in panel 602, the frequency of the first coherent light pulse is increased to a new value, resulting in a larger $\vec{k}_1$. Rather than changing the beam geometry (i.e., changing the angle θ), a correlated frequency change is made to the third coherent light pulse simultaneously with the change in frequency of the first coherent light pulse. Specifically, as shown in panel 604, the frequency of the third coherent light pulse is decreased to a value (i.e., a correlated frequency value) that maintains the phase matching. The correlated frequency value required to achieve phase matching may be determined by the same set of trigonometric equations used to determine θ at the initial frequencies and wave vectors (see FIG. 5). During these changes, the frequency of the second coherent light pulse remains fixed.

Figure 7:
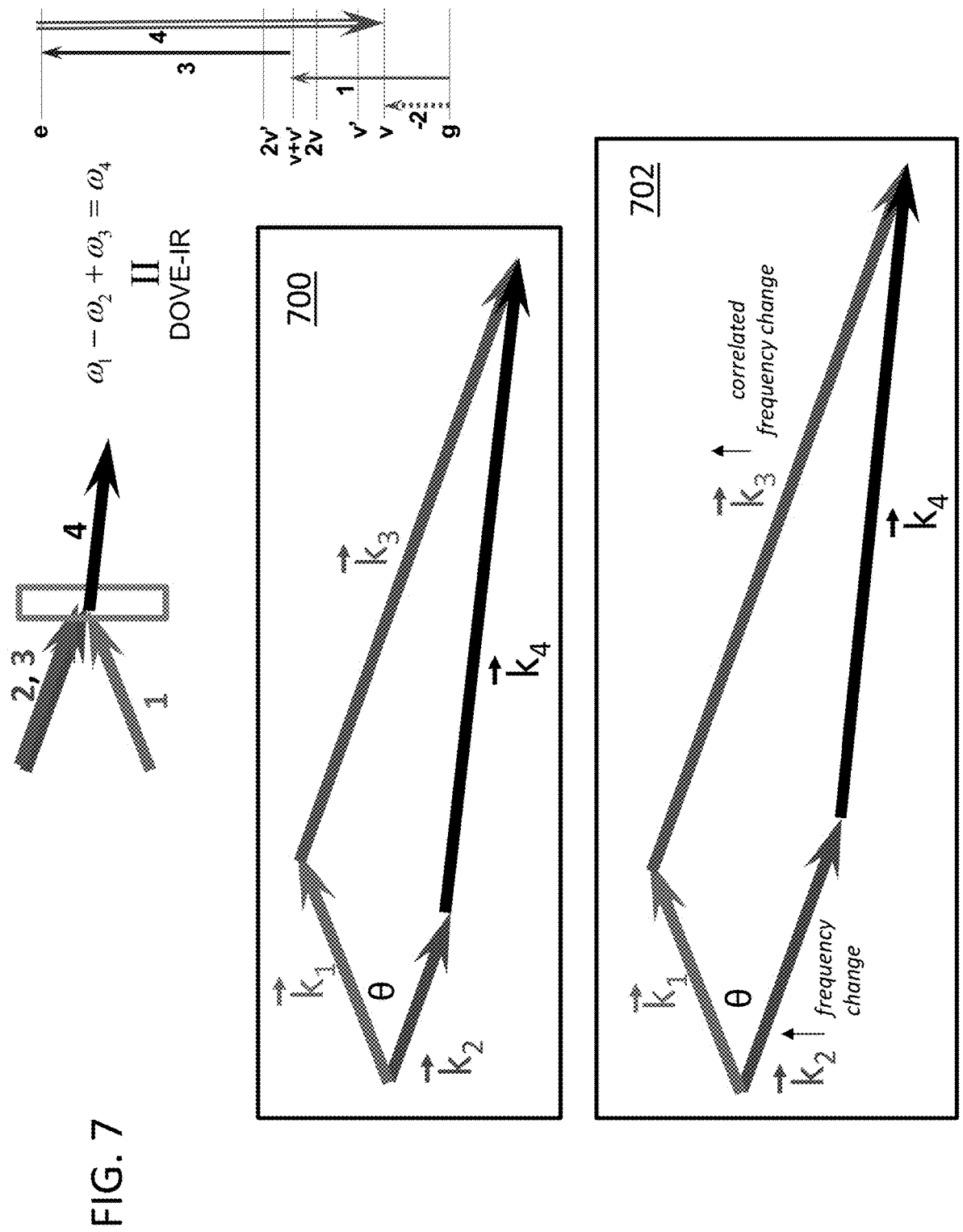
FIG. 7 illustrates the present methods according to another illustrative embodiment.

FIG. 7 illustrates another embodiment of the present methods, also involving three coherent light pulses (m=3) and the DOVE-IR quantum pathway. However, a different beam geometry is used in which the second and third coherent light pulses are collinear. As shown in panel 700, the angle θ is selected to achieve phase matching for initial frequencies $\omega_1$, $\omega_2$, $\omega_3$, initial wave vectors $\vec{k}_1$, $\vec{k}_2$, $\vec{k}_3$ and the DOVE-IR quantum pathway $\vec{k}_{4(output)} = \vec{k}_1 - \vec{k}_2 + \vec{k}_3$.

Next, in panel 702, the frequency of the second coherent light pulse is increased to a new value, resulting in a larger $\vec{k}_2$. The angle θ remains fixed and a correlated frequency change is made to the third coherent light pulse simultaneously with the change in frequency of the second coherent light pulse. Specifically, the frequency of the third coherent light pulse is increased to a value (i.e., a correlated frequency value) that maintains the phase matching. The correlated frequency value required to achieve phase matching may be determined by the same set of trigonometric equations used to determine θ at the initial frequencies and wave vectors (see FIG. 5). During these changes, the frequency of the first coherent light pulse remains fixed.

FIGS. 6 and 7 illustrate scenarios involving a single frequency change in one of the coherent light pulses (i.e., i=2). However, as described above, the value of i is not particularly limited. Similarly, as described above, the frequencies of more than two coherent light pulses may be scanned simultaneously.

In the present methods, the m coherent light pulses may also be characterized by the time delays between individual coherent light pulses. By way of illustration, time delays may be defined relative to the first coherent light pulse. For example, if m=3, these time delays may be such that $\tau_{21}=\tau_2-\tau_1$ and $\tau_{31}=\tau_3-\tau_1$. The time delays determine the order in which the coherent light pulses interact with the target entity, and in general, any order may be used. In embodiments, the m coherent light pulses are temporally overlapped, i.e., the time delay between individual coherent light pulses is zero. The time delays between individual coherent light pulses may be fixed during the simultaneous scanning described above. However, additional steps may be carried out in the method using different values of the time delays.

In the present method, the m coherent light pulses may be also each characterized by a number of other properties including spectral width (~0.1-500 cm$^{-1}$) and temporal width (1500 to 0.030 ps), which are generally selected based upon the desired CMDS excitation scheme. The m coherent light pulses may be each characterized by a repetition rate (~10 to $10^8$ Hz) (e.g., achieved by pulse picking or chopping), which is generally selected to provide a desired data acquisition speed. Note that the pulse energy and repetition rate choices are inversely correlated. The m coherent light pulses may be each characterized by pulse energy (~$10^{-2}$ to $10^{-9}$ joules), which is generally selected to provide sufficient intensity to ensure nonlinear interactions with the target entity.

Regarding pulse energy, the pulse energy may be selected so that the quantum transitions excited by individual coherent light pulses are single-photon transitions (i.e., requiring the interaction of a single photon to induce the quantum transition) or are multiphoton transitions (i.e., requiring the simultaneous interaction of multiple photons to induce the quantum transition). Thus, throughout the present disclosure, each "$\omega_m$," and each "$\vec{k}_m$," (and the like) may refer to $n_m*\omega_m$ and $n_m*\vec{k}_m$, respectively, wherein $n_m$ is the number of photons. (This $n_m$ is not the same as the indices of refraction referred to throughout the present disclosure; the meaning of each $n_m$ will be clear to those of ordinary skill based on context.) In embodiments, n=1, i.e., the quantum transitions are single-photon transitions. In other embodiments, n=2, i.e., the quantum transitions are multi-photon transitions. The value of $n_m$ for each coherent light pulse may be independently selected. That is, the value of $n_m$ need not be the same for each coherent light pulse.

Figure 8:
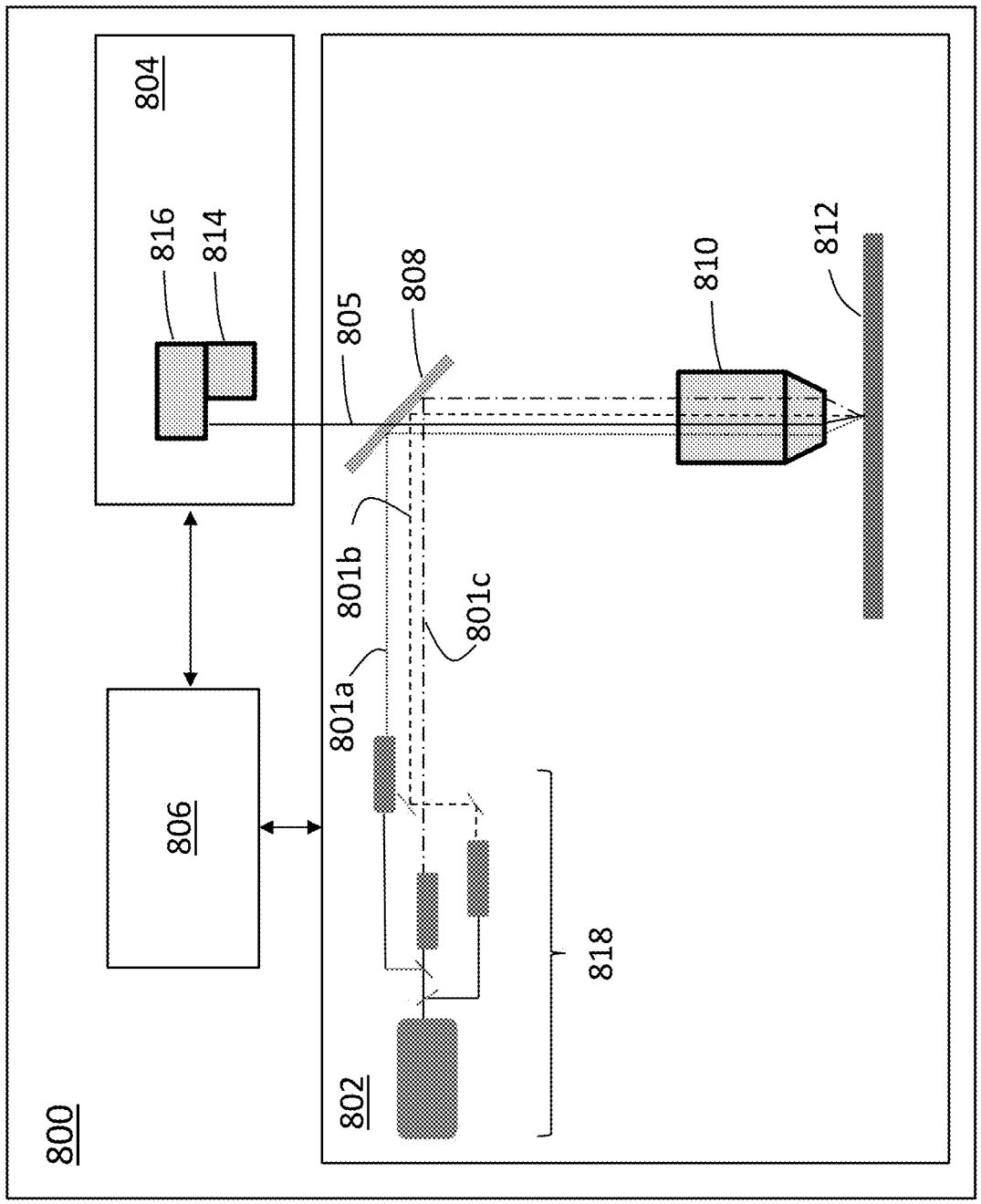
FIG. 8 shows a system which may be used to carry out the present methods according to an illustrative embodiment.

Systems for carrying out the present methods are also provided. An illustrative system 800 is shown in FIG. 8, but additional or fewer components may be included. In addition, the designation of components shown as being members of a particular subsystem is not meant to be limiting in any way. The system 800 may include an optical subsystem 802 configured to direct the set of m (in this embodiment, m=3) coherent light pulses 801*a-b* at the location in the sample; a detection subsystem 804 configured to detect the coherent output signal 805 generated by a target entity in the sample; and a controller 806 configured to control operation of one or more components of the system 800, including one or more components of the optical and detection subsystems 802, 804. It is noted that system 800 may be reconfigured so that the coherent light pulses 801*a-b* may illuminate the sample on one side and the coherent output signal that is transmitted from an opposing side of the sample is detected.

As shown in FIG. 8, the optical subsystem 802 generally comprises optics configured to receive the coherent light pulses 801*a-c* and to direct them into the sample. These optics may include various optics (e.g., dichroic mirror 808) configured to direct the coherent light pulses 801*a-c* according to a desired beam geometry and optics (e.g., microscope objective 810) configured to focus the coherent light pulses 801*a-c* into the sample supported on a stage 812. The detection subsystem 804 generally comprises device(s) configured to detect light, including devices to measure intensity at a particular frequency of the light (e.g., photomultiplier tube 814 and monochromator 816). The monochromator 816 may be a scannable monochromator which is useful to detect the coherent output signal over a range of frequencies.

The system 800, including the optical subsystem 802, may comprise the light sources (and associated optics) 818 configured to generate the coherent light pulses 801*a-c* which have certain of the characteristics described herein (e.g., frequency, spectral width, temporal width, pulse energy, polarization). Such optics may include those configured to achieve the desired beam geometry. Optics configured to set and adjust the time delay between the coherent light pulse 801*a-c* may be included. Choppers configured to achieve desired repetition rates for the coherent light pulses 801*a-c* may be included.

The system 800, including the detection subsystem 804, may comprise optics configured to receive light generated from the sample or passing through the sample and to direct the light towards the devices of the detection subsystem, including optics configured to focus or collimate the light. An aperture or optical filters configured to receive light generated from the sample or passing through the sample and to block undesired light (e.g., certain coherent light pulses or undesired coherent output signals) may be included. However, the monochromator 816 may also be used for this purpose.

The system 800 may include other components (not shown) for sequentially analyzing multiple locations in the sample. Sample scanning may be achieved by moving the coherent light pulses relative to the sample, e.g., via scanning optics, or by moving the sample relative to the coherent light pulses, e.g., via a scanning stage.

The controller 806 may be integrated into the system 800 as part of a single device, or its functionality may be distributed across one or more devices that are connected to other system 800 components directly or through a network that may be wired or wireless. A database (not shown), a data repository for the system 800, may also be included and operably coupled to the controller 806.

Figure 9:
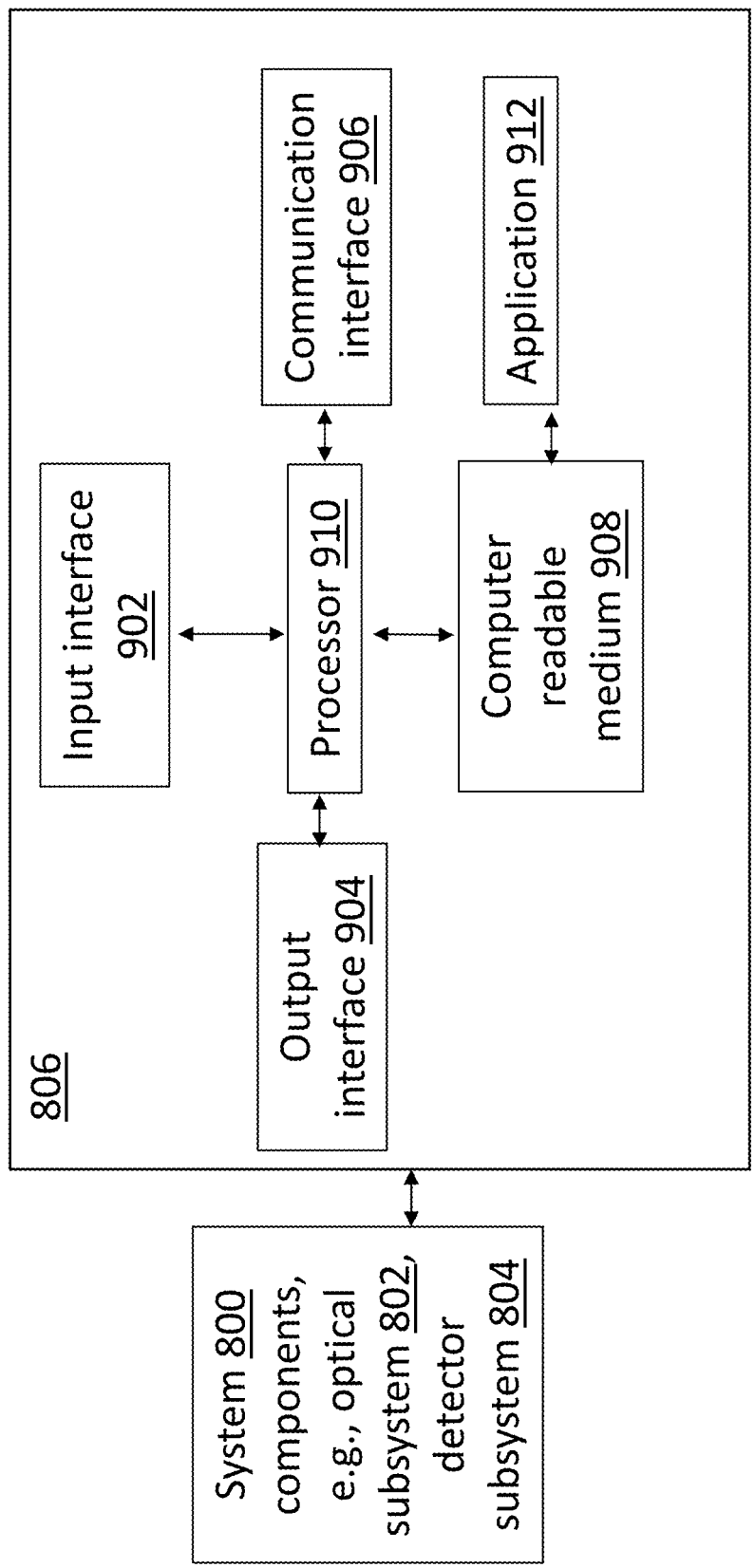
FIG. 9 is a block diagram of an illustrative controller which may be used in the system of FIG. 8.

As shown in the illustrative embodiment of FIG. 9, the controller 806 may include an input interface 902, an output interface 904, a communication interface 906, a computer-readable medium 908, a processor 910, and an application 912. The controller 806 may be a computer of any form factor including an electrical circuit board.

The input interface 902 provides an interface for receiving information into the controller 806. Input interface 902 may interface with various input technologies including, e.g., a keyboard, a display, a mouse, a keypad, etc., to allow a user to enter information into the controller 806 or to make selections presented in a user interface displayed on the display. Input interface 902 further may provide the electrical connections that provide connectivity between the controller 806 and other components of the system 800.

The output interface 904 provides an interface for outputting information from the controller 806. For example, output interface 904 may interface with various output technologies including, e.g., the display or a printer for outputting information for review by the user. Output interface 904 may further provide an interface for outputting information to other components of the system 800, including the optical and detection subsystems 802, 804.

The communication interface 906 provides an interface for receiving and transmitting data between devices using various protocols, transmission technologies, and media. Communication interface 906 may support communication using various transmission media that may be wired or wireless. Data and messages may be transferred between the controller 806, the database, other components of the system 800, and/or other external devices using communication interface 906.

The computer-readable medium 908 is an electronic holding place or storage for information so that the information can be accessed by the processor 910 of the controller 806. Computer-readable medium 908 can include any type of random-access memory (RAM), any type of read only memory (ROM), any type of flash memory, etc., such as magnetic storage devices, optical disks, smart cards, flash memory devices, etc.

The processor 910 executes instructions. The instructions may be carried out by a special purpose computer, logic circuits, or hardware circuits. Thus, the processor 910 may be implemented in hardware, firmware, or any combination of these methods and/or in combination with software. The term "execution" is the process of running an application 912 or the carrying out of the operation called for by an instruction. The instructions may be written using one or more programming language, scripting language, assembly language, etc. Processor 910 executes an instruction, meaning that it performs/controls the operations called for by that instruction. Processor 910 operably couples with the input interface 902, with the output interface 904, with the computer-readable medium 908, and with the communication interface 906 to receive, to send, and to process information. Processor 910 may retrieve a set of instructions from a permanent memory device and copy the instructions in an executable form to a temporary memory device that is generally some form of RAM.

The application 912 performs operations associated with controlling other components of the system 800. Some of these operations may include calculating beam geometries, generating sets of i frequency values, and calculating sets of i correlated frequency values to be used to carry out the present methods. Other of these operations may include controlling components of the system 800 based on such CMDS acquisition data. Some or all of the operations described in the present disclosure may be controlled by instructions embodied in the application 912. The operations may be implemented using hardware, firmware, software, or any combination of these methods. With reference to the illustrative embodiment of FIG. 9, the application 912 is implemented in software (comprised of computer-readable and/or computer-executable instructions) stored in the computer-readable medium 908 and accessible by the processor for execution of the instructions that embody the operations of application 912. The application 912 may be written using one or more programming languages, assembly languages, scripting languages, etc.

Figure 10:
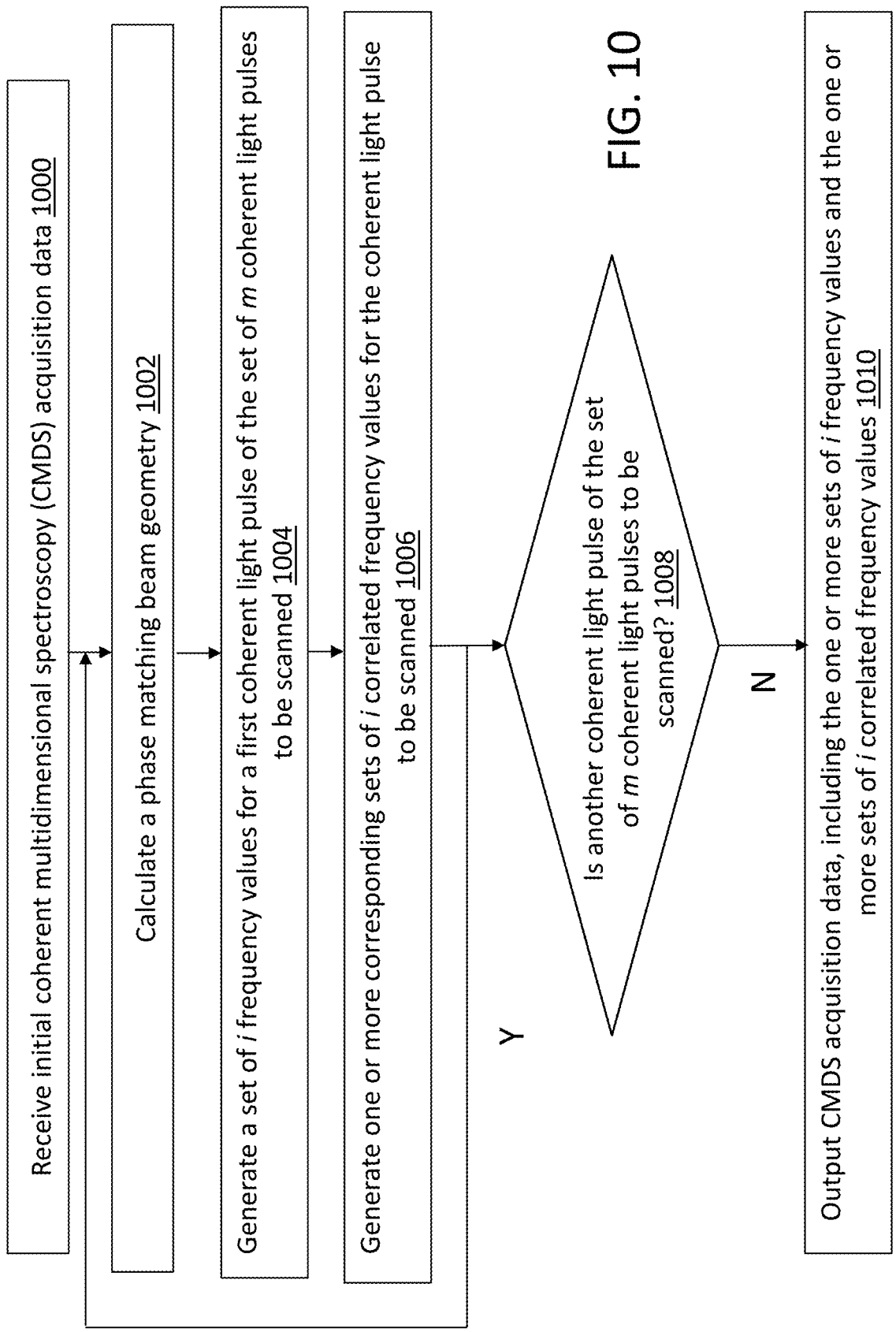
FIG. 10 depicts operations which may be performed by an application of the controller of FIG. 9 to generate CMDS acquisition data for carrying out the present methods.
Figure 11:
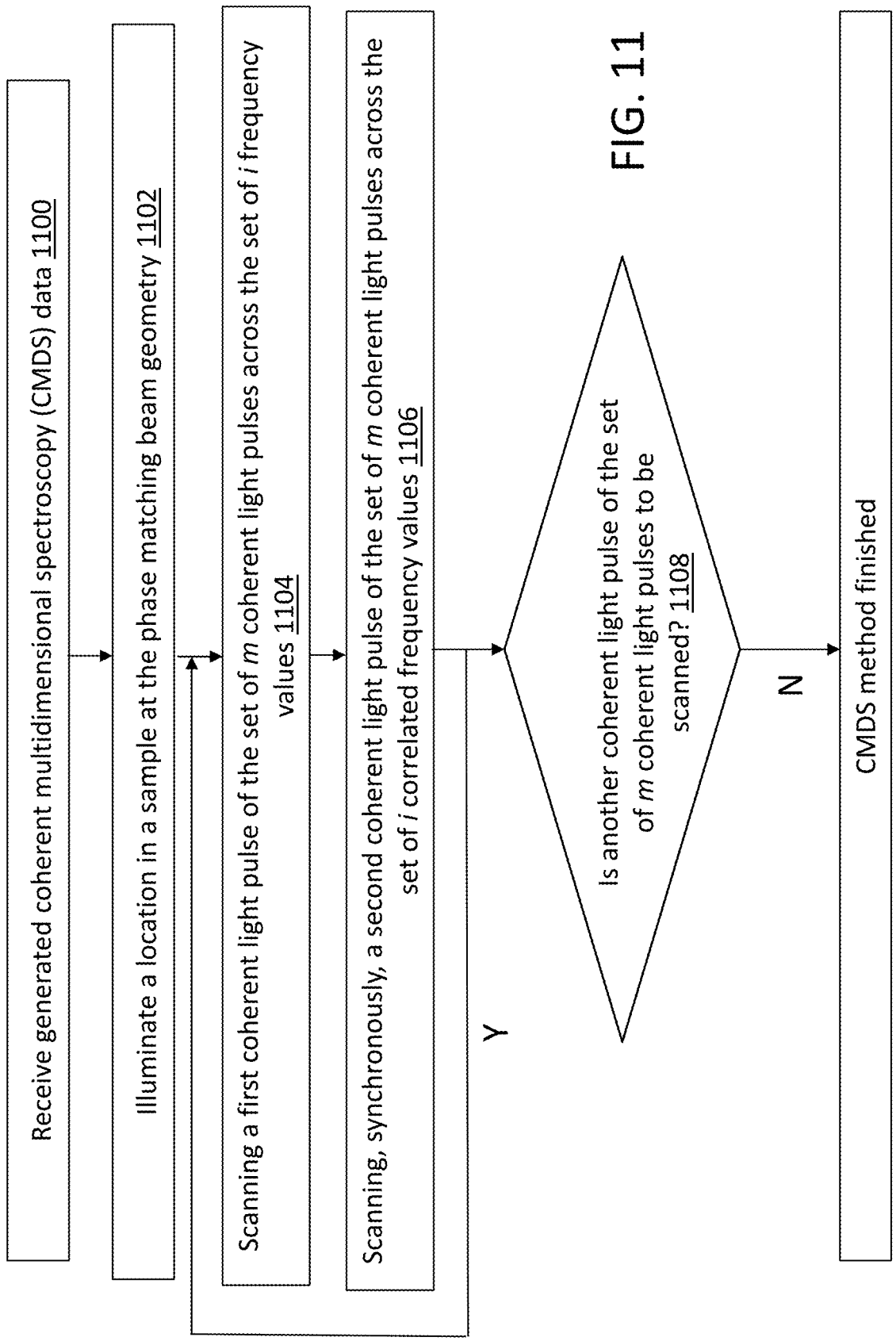
FIG. 11 depicts operations which may be performed by the application of the controller of FIG. 9 to control components of the system of FIG. 8 based on the CMDS acquisition data.

With reference to FIGS. 10 and 11, operations which may be associated with the application 912 are described according to illustrative embodiments. FIG. 10 relates to operations for generating CMDS acquisition data such as that described above. FIG. 11 relates to operations for controlling components of systems for carrying out the present methods, including the system 800, based on such CMDS acquisition data. In these figures, additional or fewer operations may be performed depending on the embodiment. Also, the order of the operations is not intended to be limiting. Thus, although some of the operational flows are presented in sequence, the various operations may be performed in various repetitions, concurrently, and/or in other orders than those that are illustrated.

With reference to FIG. 10, as an illustrative embodiment, in a first operation 1000, initial CDMS data is received by the processor 910. Illustrative initial CMDS data includes the following: a desired quantum pathway to be monitored; initial frequency values for a desired set of m coherent light pulses; initial time delays between pairs of coherent light pulses in the set of m coherent light pulses; a listing of which coherent light pulses are to be scanned in the set of m coherent light pulses and in which order; for each coherent light pulse to be scanned, a desired final frequency value and a desired frequency step size; and a desired sample to be illuminated. The initial CMDS data may be input by a user via the input interface 902, received by reading from the computer-readable medium 908 or the database (e.g., via the communication interface 906), or combinations thereof.

In a second operation 1002, a beam geometry which achieves optimal phase matching is calculated. These calculations employ the methodology illustrated in FIGS. 3-5 and may include the following: calculating, via the desired quantum pathway, an initial frequency $\omega_{output}$ for the coherent output signal generated by the set of m coherent light pulses; calculating, via the Sellmeier equation, indices of refraction $n_m$ for each coherent light pulse of the set of m coherent light pulses and the coherent output signal; calculating, $$\text{via } \frac{n_m \omega_m}{c},$$

initial wave vectors $\vec{k}_m$ for each coherent light pulse in the set of m coherent light pulses and an initial wave vector $\vec{k}_{output}$ for the coherent output signal; and calculating angles between pairs of the coherent light pulses in the set of m coherent light pulses via one or more trigonometric equations (see FIGS. 4-5). Some parameters of the beam geometry may be provided as part of the initial CMDS data, e.g., which coherent light pulses are to be collinear. In other embodiments, all parameters of the beam geometry may be provided as part of the initial CMDS data.

In a third operation 1004, a set of i frequency values is generated for a first coherent light pulse of the set of m coherent light pulses to be scanned, based on the initial frequency value, final frequency value, and desired frequency step size. The set of i frequency values may include the initial frequency value $\omega_m$ for the first coherent light pulse to be scanned.

In a fourth operation 1006, one or more corresponding sets i of correlated frequency values is generated. (One or more, depending upon how many coherent light pulses in the set of m coherent light pulses are to be scanned simultaneously with the first coherent light pulse.) First, one of the coherent light pulses in the set of m coherent light pulses (other than the first coherent light pulse to be scanned) is selected. This may be a coherent light pulse which is oriented collinearly with the first coherent light pulse to be scanned. Next, for the desired frequency step size (i.e., the incremental changes in frequency to be made in the set of i frequency values), a correlated frequency change in the selected coherent light pulse that ensures that the coherent output signal equals the initial frequency $\omega_{output}$ and the initial wavevector $\vec{k}_{output}$ is calculated. This calculation makes use of the calculated beam geometry from operation 1002. That is, the angles between pairs of coherent light pulses in the set of m coherent light pulses are fixed at those obtained during operation 1002. Otherwise, the calculation employs the trigonometric equations applicable to the calculated beam geometry. Finally, the set of i correlated frequency values is generated based on the initial frequency value of the selected coherent light pulse, the calculated correlated frequency change, and the integer i. Thus, the set of i correlated frequency values may include the initial frequency $\omega_m$ of the selected coherent light pulse.

In the set of i correlated frequency values generated in the fourth operation 1004, each correlated frequency value is associated with a corresponding frequency value in the set of i frequency values as a correlated frequency pair. (As noted above, this correlated frequency pair may be part of a correlated frequency grouping if more than two coherent light pulses in the set of m coherent light pulses are to be scanned simultaneously.) Due to the phase matching described above, the coherent output signal generated at each correlated frequency pair equals the initial frequency $\omega_{output}$ and the coherent output signal generated at each correlated frequency pair equals the initial wave vector $\vec{k}_{output}$.

In a fifth operation 1008, a determination is made whether another coherent light pulse of the set of m coherent light pulses is to be scanned. If the determination is yes, the operations 1002, 1004, and 1006 may be repeated.

If the determination is no, in a sixth operation 1010, the CMDS acquisition data generated in the operations described above is output to a component of the system 800, e.g., to the optical subsystem 802. Such CMDS acquisition data includes the one or more sets of i frequency values and the one or more sets of i correlated frequency values. The outputted data may be used in controlling operation of such components, including the optical subsystem 802, to carry out the present methods.

FIG. 11 relates to illustrative operations for controlling components of systems for carrying out the present methods, including the system 800, based on CMDS acquisition data such as that generated by the operations of FIG. 10. In a first operation 1100, generated CMDS acquisition data comprising one or more sets of i frequency values and one or more sets of i correlated frequency values is received by a component of the system 800, e.g., by the optical subsystem 802. Other data may be received as necessary for carrying out the present methods, e.g., initial CMDS data such as initial time delays, pulse energies, etc.

In a second operation 1102, a location in the sample is illuminated with the set of m coherent light pulses at the phase matching beam geometry (e.g., calculated in FIG. 10), each coherent light pulse having the initial frequency $\omega_m$ and the initial wavevector $\vec{k}_m$ to generate the coherent output signal having the initial frequency output and the initial wavevector $\vec{k}_{output}$.

In a third operation 1104, a first coherent light pulse of the set of m coherent light pulses is scanned across the set of i frequency values.

In a fourth operation 1106, a second coherent light pulse of the set of m coherent light pulses is scanned, simultaneously, across the set of i correlated frequency values. (However, as described above, another coherent light pulse in the set of m coherent light pulses may be scanned across another set of i correlated frequency values, simultaneously, along with the first and second coherent light pulses.) The frequencies of any of the coherent light pulses of the set of m coherent light pulses not being scanned remains fixed at the respective initial frequencies. As described above, the result of the simultaneous scanning is that the coherent output signal generated at each correlated frequency grouping has the initial frequency $\omega_{output}$ and the initial wavevector $\vec{k}_{output}$.

In a fifth operation 1108, a determination is made whether an additional set of i frequency values exists, i.e., whether an additional coherent light pulse in the set of m coherent light pulses is to be scanned. If the determination is yes, the third and fourth operations may be repeated with the additional set of i frequency values and the corresponding additional set(s) of i correlated frequency values. If the determination is no, the CMDS method is finished. During the simultaneous scanning operations 1004, 1106 (as well as the initial illumination operation 1102), the coherent output signal is detected by the detection subsystem 804. Thus, although not shown in FIG. 11, operations related to controlling components of the detection subsystem 804, processing detected coherent output signals, displaying detected coherent output signals, etc., may be included.

It is noted that devices including the processor 910, the computer-readable medium 908 operably coupled to the processor 910, the computer-readable medium 908 having computer-readable instructions stored thereon that, when executed by the processor 910, cause the device to perform any of the operations described above (or various combinations thereof), are encompassed by the present disclosure. The computer-readable medium 908 is similarly encompassed.

The present methods may be used to examine a variety of types of target entities in a variety of types of samples, e.g., chemical samples, biological samples, etc. The samples may include interfaces between different materials. As such, the methods may be used in a variety of fields such as analytical methods, catalysis, chemical synthesis, environmental chemistry, forensic analysis, membrane biology, neurobiology, pathology, pharmacology, and composite materials.

Figures 12A, 12B, 12C:
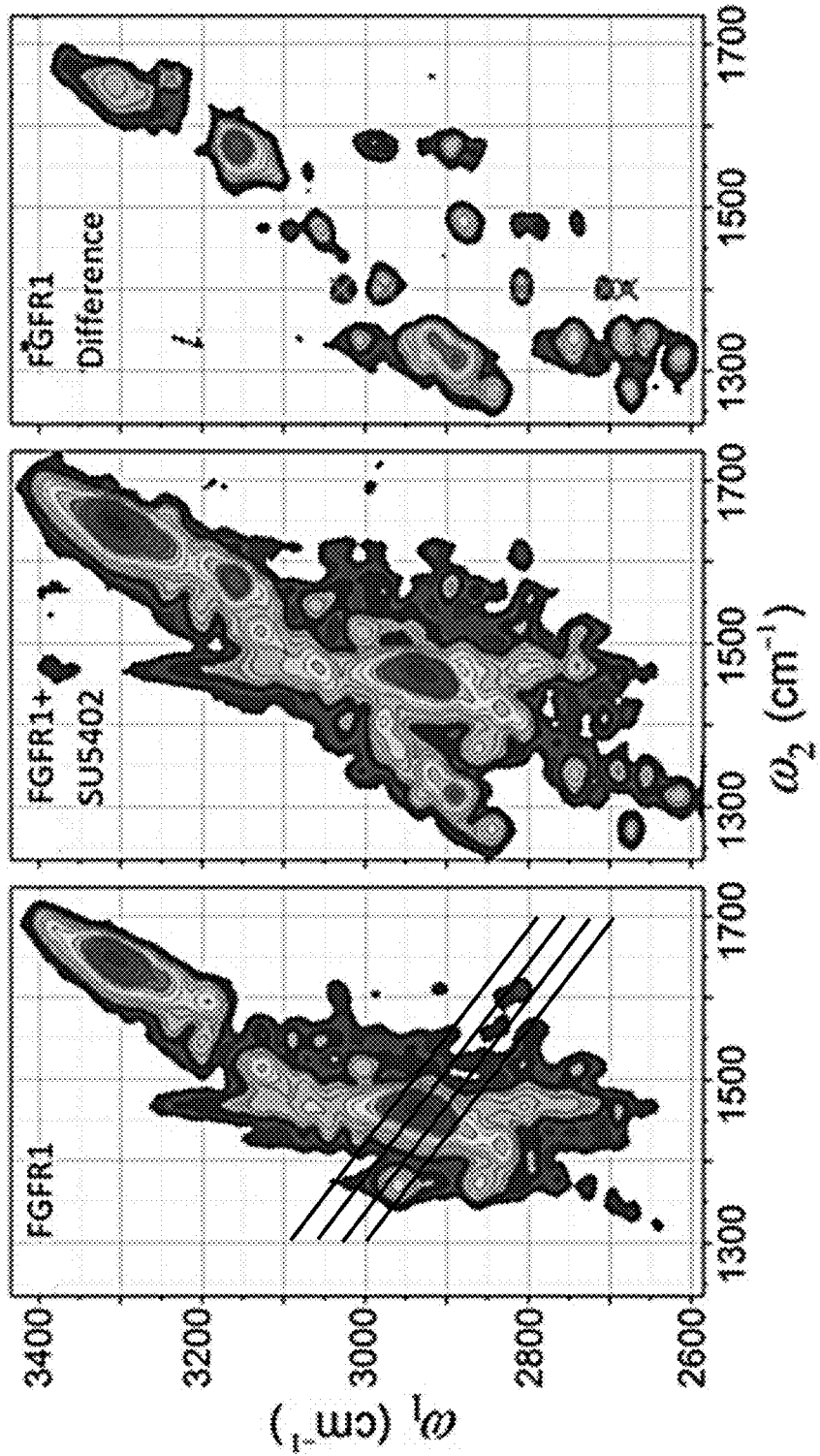
FIGS. 12A-12C show two-dimensional (2D), doubly vibrationally enhanced (DOVE) four wave mixing (FWM) spectra of a drug (FIG. 12A), a complex of the drug with a target (FIG. 12B), and the difference spectrum (FIG. 12C).

As noted above, at least by solving the phase matching problem inherent to frequency domain CDMS by employing correlated frequency changes, the present methods unleash the full power of CMDS. By way of illustration, application of the present methods is described with reference to FIGS. 12A-12C. These figures show the results of an experiment on drug-substrate binding. The drug is SU5402, a potent and selective inhibitor of the target protein, a fibroblast growth factor receptor (FGFR). FIG. 12A shows a two-dimensional (2D), DOVE spectrum of the drug (FIG. 12A), the drug-target complex (FIG. 12B) and the difference spectrum (FIG. 12C). Each was acquired by exciting two vibrational modes and virtual electronic states of the drug-target complex. The grayscale map represents the output intensity as $\omega_1$ and $\omega_2$ become resonant with the $v$ and $v+v'$ modes. The three spectra show the cross-peaks between the fundamental vibrational modes (x-axis) and the corresponding overtone and combination bands (y-axis) of the protein target alone (FIG. 12A), the drug and protein target (FIG. 12B), and the difference spectrum (FIG. 12C). The protein target spectrum (FIG. 12A) has over ~200 peaks, illustrating the complexity of the system. The drug-target spectrum (FIG. 12B) has an additional 63 peaks that are resolved in the difference spectrum (FIG. 12C), illustrating the underlying power of CMDS. The cross marks identify 6 peaks in the difference spectrum (FIG. 12C) that arise specifically from drug-target binding where the protein and drug modes are coupled by the binding. The presence of these cross-peaks involving vibrational states from the drug and target ensures that they arise from the interactions binding them. These kinds of experiments are necessary to fully understand drug-substrate binding and facilitate the development of new kinds of targeted therapies and vaccines.

The overlaid diagonal lines on FIG. 12A demonstrate how an embodiment of the present methods may be used to carry out these kinds of experiments. While the frequency of the second coherent light pulse ($\omega_2$) is scanned across the desired frequency range, at each frequency value within that desired frequency range, a simultaneous correlated frequency change is made to the frequency of the first coherent light pulse ($\omega_1$). Only a few diagonal lines are shown for clarity. For example, as shown by the bottom diagonal lines, when $\theta_2$ is scanned from 1300 cm$^{-1}$ to 1700 cm$^{-1}$, correlated frequency changes are made in $\omega_1$ such that $\omega_1$ is scanned from 3000 cm$^{-1}$ to 2700 cm$^{-1}$. Not only is this approach vastly more efficient than existing CMDS methods, but also the present methods enable spectroscopic investigations over much larger spectral range.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for coherent multidimensional spectroscopy, the method comprising:
   (a) illuminating a location in a sample with a set of m coherent light pulses, each coherent light pulse having an initial frequency $\omega_m$ and an initial wave vector $\vec{k}_m$, wherein m≥2, to generate a coherent output signal having an initial frequency $\omega_{output}=\Sigma\pm\omega_m$ and an initial wave vector $\vec{k}_{output}=\Sigma\pm\vec{k}_m$;
   (b) scanning a first coherent light pulse of the set of m coherent light pulses across a set of i frequency values, wherein i≥2, the set of i frequency values including the first coherent light pulse having initial frequency $\omega_1$;
   (c) scanning, simultaneously, a second coherent light pulse of the set of m coherent light pulses across a set of i correlated frequency values, the set of i correlated frequency values including the second coherent light pulse having initial frequency $\omega_2$, wherein each correlated frequency value is associated with a corresponding frequency value of the set of i frequency values as a correlated frequency grouping;
   wherein each correlated frequency value is selected so that the coherent output signal generated at each correlated frequency grouping equals the initial frequency $\omega_{output}$ and the coherent output signal generated at each correlated frequency grouping equals the initial wave vector $\vec{k}_{output}$; and
   (d) detecting the coherent output signal.

2. The method of claim 1, wherein m=2 and the initial frequency is $\omega_{output}=\omega_1+\omega_2$ and the initial wave vector is $\vec{k}_{output}=\vec{k}_1+\vec{k}_2$.

3. The method of claim 1, wherein m=3 and the initial frequency is $\omega_{output}=\pm\omega_1\pm\omega_2\pm\omega_3$ and the initial wave vector is $\vec{k}_{output}=\pm\vec{k}_1\pm\vec{k}_2\pm\vec{k}_3$.

4. The method of claim 1, wherein m=4 and the initial frequency is $\omega_{output}=\pm\omega_1\pm\omega_2\pm\omega_3\pm\omega_4$ and the initial wave vector is $\vec{k}_{output}=\pm\vec{k}_1\pm\vec{k}_2\pm\vec{k}_3\pm\vec{k}_4$.

5. The method of claim 3, wherein the initial frequency is $\omega_{output}=\omega_1-\omega_2+\omega_3$ and the initial wave vector is $\vec{k}_{output}=\vec{k}_1-\vec{k}_2+\vec{k}_3$.

6. The method of claim 3, wherein the initial frequency is $\omega_{output}=\omega_1+\omega_2+\omega_3$ and the initial wave vector is $\vec{k}_{output}=\vec{k}_1+\vec{k}_2+\vec{k}_3$.

7. The method of claim 1, wherein angles are defined between propagation axes of each pair of coherent light pulses in the set of m coherent light pulses and the angles are fixed during steps (a)-(c).

8. The method of claim 1, wherein step (b) is characterized by a frequency change between frequency values in the set of i frequency values and step (c) is characterized by a correlated frequency change between correlated frequency values in the set of i correlated frequency values, and further wherein the frequency change and the correlated frequency change differ in one or more of magnitude and direction.

9. The method of claim 1, wherein the first and second coherent light pulses are collinear.

10. The method of claim 1, further comprising
   (e) scanning, simultaneously, a third coherent light pulse of the set of m coherent light pulses across a second set of i correlated frequency values, the second set of i correlated frequency values including the third coherent light pulse having initial frequency $\omega_3$, wherein each correlated frequency value in the second set of i correlated frequency values is also a member of the correlated frequency grouping;
wherein each correlated frequency value in the second set of i correlated frequency values is selected so that the coherent output signal generated at each correlated frequency grouping equals the initial frequency $\omega_{output}$ and the coherent output signal generated at each correlated frequency grouping equals the initial wave vector $\vec{k}_{output}$.

11. The method of claim 10, wherein the first, the second, and the third coherent light pulses are collinear.

12. A system for coherent multidimensional spectroscopy, the system comprising:
an optical subsystem configured to illuminate a location in a sample with a set of m coherent light pulses, each coherent light pulse having an initial frequency $\omega_m$ and an initial wave vector $\vec{k}_m$, wherein m≥2, to generate a coherent output signal having an initial frequency $\omega_{output}=\Sigma\pm\omega_m$ and an initial wave vector $\vec{k}_{output}=\Sigma\pm\vec{k}_m$;
a detection subsystem configured to detect the coherent output signal; and
a controller comprising a processor and a non-transitory computer-readable medium operably coupled to the processor, the non-transitory computer-readable medium comprising instructions, that, when executed by the processor, cause the system to
 (a) illuminate the location with the set of m coherent light pulses to generate the coherent output signal;
 (b) scan a first coherent light pulse of the set of m coherent light pulses across a set of i frequency values, wherein i≥2, the set of i frequency values including the first coherent light pulse having initial frequency $\omega_1$;
 (c) scan, simultaneously, a second coherent light pulse of the set of m coherent light pulses across a set of i correlated frequency values, the set of i correlated frequency values including the second coherent light pulse having initial frequency $\omega_2$, wherein each correlated frequency value is associated with a corresponding frequency value of the set of i frequency values as a correlated frequency grouping;
 wherein each correlated frequency value is selected so that the coherent output signal generated at each correlated frequency grouping equals the initial frequency $\omega_{output}$ and the coherent output signal generated at each correlated frequency grouping equals the initial wave vector $\vec{k}_{output}$; and
 (d) detect the coherent output signal.

13. The system of claim 12, the computer-readable medium further having computer-readable instructions stored thereon that, when executed by the processor, cause the controller to generate the set of i correlated frequency values and output the set of i correlated frequency values to the system.

14. A method for coherent multidimensional spectroscopy using the system of claim 12, the method comprising:
 (a) illuminating the location with the set of m coherent light pulses to generate the coherent output signal;
 (b) scanning the first coherent light pulse of the set of m coherent light pulses across the set of i frequency values;
 (c) scanning, simultaneously, the second coherent light pulse of the set of m coherent light pulses across the set of i correlated frequency values; and
 (d) detecting the coherent output signal.

15. A controller for controlling the operations of a system for coherent multidimensional spectroscopy, the controller comprising:
a processor; and
a non-transitory computer-readable medium operably coupled to the processor, the non-transitory computer-readable medium comprising instructions, that, when executed by the processor, cause the system to:
 (a) illuminate a location in a sample with a set of m coherent light pulses, each coherent light pulse having an initial frequency $\omega_m$ and an initial wave vector $\vec{k}_m$, wherein m≥2, to generate a coherent output signal having an initial frequency $\omega_{output}=\Sigma\pm\omega_m$ and an initial wave vector $\vec{k}_{output}=\Sigma\pm\vec{k}_m$;
 (b) scan a first coherent light pulse of the set of m coherent light pulses across a set of i frequency values, wherein i≥2, the set of i frequency values including the first coherent light pulse having initial frequency $\omega_1$;
 (c) scan, simultaneously, a second coherent light pulse of the set of m coherent light pulses across a set of i correlated frequency values, the set of i correlated frequency values including the second coherent light pulse having initial frequency $\omega_2$, wherein each correlated frequency value is associated with a corresponding frequency value of the set of i frequency values as a correlated frequency grouping;
 wherein each correlated frequency value is selected so that the coherent output signal generated at each correlated frequency grouping equals the initial frequency $\omega_{output}$ and the coherent output signal generated at each correlated frequency grouping equals the initial wave vector $\vec{k}_{output}$; and
 (d) detect the coherent output signal.

16. The controller of claim 15, the computer-readable medium further having computer-readable instructions stored thereon that, when executed by the processor, cause the controller to generate the set of i correlated frequency values and output the set of i correlated frequency values to the system.

17. A non-transitory computer-readable medium comprising computer-readable instructions stored thereon that, when executed by a processor, cause a controller for controlling the operations of a system for coherent multidimensional spectroscopy to direct the system to:
 (a) illuminate a location in a sample with a set of m coherent light pulses, each coherent light pulse having an initial frequency $\omega_m$ and an initial wave vector $\vec{k}_m$, wherein m≥2, to generate a coherent output signal having an initial frequency $\omega_{output}=\Sigma\pm\omega_m$ and an initial wave vector wave vector $\vec{k}_{output}=\Sigma\pm\vec{k}_m$;
 (b) scan a first coherent light pulse of the set of m coherent light pulses across a set of i frequency values, wherein i≥2, the set of i frequency values including the first coherent light pulse having initial frequency $\omega_1$;
 (c) scan, simultaneously, a second coherent light pulse of the set of m coherent light pulses across a set of i correlated frequency values, the set of i correlated frequency values including the second coherent light pulse having initial frequency $\omega_2$, wherein each correlated frequency value is associated with a corresponding frequency value of the set of i frequency values as a correlated frequency grouping;

wherein each correlated frequency value is selected so that the coherent output signal generated at each correlated frequency grouping equals the initial frequency $\omega_{output}$ and the coherent output signal generated at each correlated frequency grouping equals the initial wave vector $\vec{k}_{output}$; and (d) detect the coherent output signal.

18. The non-transitory computer-readable medium of claim 17, further comprising instructions that, when executed by the processor, cause the controller to generate the set of i correlated frequency values and output the set of i correlated frequency values to the system.

* * * * *

UNITED STATES PATENT AND TRADEMARK OFFICE
CERTIFICATE OF CORRECTION

| | |
|---|---|
| PATENT NO. | : 11,486,818 B2 |
| APPLICATION NO. | : 17/329454 |
| DATED | : November 1, 2022 |
| INVENTOR(S) | : John Curtis Wright |

It is certified that error appears in the above-identified patent and that said Letters Patent is hereby corrected as shown below:

On the Title Page

Column 2, in the Item (57), Under "ABSTRACT", Lines 6-7, delete "wavevector wave vector" and insert -- wave vector --, therefor.

In the Specification

In Column 1, Lines 61-62, delete "wavevector wave vector" and insert -- wave vector --, therefor.

In Column 4, Line 63, delete "CDMS" and insert -- CMDS --, therefor.

In Column 5, Line 9, delete "CDMS" and insert -- CMDS --, therefor.

In Column 6, Line 66, delete "$\vec{k}_{4(output)} = \vec{k}_1 - \vec{k}_2 + \vec{k}_3$." and insert -- $\vec{k}_{4\,(output)} = \vec{k}_1 - \vec{k}_2 + \vec{k}_3$ --, therefor.

In Column 10, Line 30, delete "CDMS" and insert -- CMDS --, therefor.

In Column 12, Line 66, delete "CDMS" and insert -- CMDS --, therefor.

In the Claims

In Column 16, Claim 17, Line 55, delete "wave vector wave vector" and insert -- wave vector --, therefor.

Signed and Sealed this
Thirty-first Day of January, 2023

Katherine Kelly Vidal
*Director of the United States Patent and Trademark Office*